United States Patent [19]

Fukui

[11] Patent Number: 4,898,254

[45] Date of Patent: Feb. 6, 1990

[54] ELECTRONIC WEIGHING APPARATUS

[75] Inventor: Kensuke Fukui, Sumoto, Japan

[73] Assignee: Sanyo Electric Co., Ltd., Moriguchi, Japan

[21] Appl. No.: 355,255

[22] Filed: May 19, 1989

[30] Foreign Application Priority Data

Jul. 11, 1988 [JP] Japan .................................. 63-172401
Jul. 13, 1988 [JP] Japan .................................. 63-174616

[51] Int. Cl.$^4$ ............................................. G01G 3/14
[52] U.S. Cl. ............................. 177/210 C; 177/25.13
[58] Field of Search ......................... 177/210 C, 25, 13

[56] References Cited

U.S. PATENT DOCUMENTS 4,244,020  1/1981  Ratcliff ......................... 177/25.16 X
4,329,881  5/1982  Schloss ......................... 177/210 R X
4,548,286  10/1985  Sashiki et al. ................. 177/25.18 X Primary Examiner—George H. Miller, Jr.
Attorney, Agent, or Firm—Armstrong, Nikaido, Marmelstein, Kubovcik, & Murray

[57] ABSTRACT

An electronic weighing apparatus is disclosed which detects weight of a subject by variation in capacitance, converts an oscillating output of an oscillating circuit corresponding to said variation in capacitance and displays the converted value on a display. In this apparatus, a solar battery and a supplementary cell are employed as a power source and on-off control of electric power supply from the supplementary battery to each circuit of the apparatus is effected by the output voltage of the solar battery.

29 Claims, 8 Drawing Sheets

(a) FIRST ALARM SIGNAL (b) SECOND ALARM SIGNAL

ELECTRONIC WEIGHING APPARATUS

BACKGROUND OF THE INVENTION (1) Field of the Invention

The present invention relates to an electronic weighing apparatus, and more particularly to an electronic weighing apparatus which detects weight of a subject by variation in capacitance, converts an oscillation output of an oscillating circuit corresponding to the above variation in capacitance into weight and displays the converted value on a display.

(2) Description of the Prior Art

Conventional electronic weighing apparatuses of the above type are disclosed in Japanese Utility Model Publication No. 62-111630 and GB No. 2047410 (Japanese Patent Publication No. 55-147317). The electronic weighing apparatus disclosed in the former employs a solar battery as a power source.

In this type of electronic weighing apparatus, however, enough circuit current cannot be obtained by a solar battery only. That is, although a circuit current of about 150 $\mu$A is required to operate the apparatus, the electronic weighing apparatus is usually used in a place such as a kitchen where an incandescent lamp or a fluorescent lamp is used as a light source and where electric current obtained from the solar battery is 10 $\mu$A at most. Therefore, it is necessary to use the solar battery with another battery acting as a supplementary battery.

In this case, if the solar battery and the supplementary battery are only connected in parallel, the supplementary battery continues to supply electric current even in a dark place. The weighing apparatus has a characteristic that it is hardly used in such a place because it has a purpose of weighing a subject and displaying the measured value. Therefore, the electric current supplied from the supplementary battery is wasted. A conventional power source employing a solar battery with another battery entails the above problem.

SUMMARY OF THE INVENTION

A primary object of the present invention, therefore, is to provide a weighing apparatus capable of supplying electric power with less waste taking its characteristic into consideration.

Another object of the present invention is to provide a weighing apparatus designed to further reduce the waste of circuit current.

A further object of the present invention is to provide a weighing apparatus capable of effecting a weighing with a smaller amount of circuit current and higher accuracy.

A still further object of the present invention is to provide a weighing apparatus capable of operating with a smaller amount of circuit current and having an improved operability.

The above objects are fulfilled, according to the present invention, by an electronic weighing apparatus for weighing a subject, comprising a weighing circuit which detects the weight of the subject by variation in capacitance, converts an output of an oscillating circuit corresponding to the variation in capacitance into weight and displays the converted value on a display section; power supply means for supplying driving current to the weighing circuit which includes a solar battery and a supplementary battery connected substantially in parallel; and switching means inserted in an electric current path from the supplementary battery to the weighing circuit, on-off control of the switching means being effected by the output voltage of the solar battery.

The switching means may include a first switching circuit which is closed and opened by the output voltage of the solar battery and a second switching circuit which opens at least the electric current path from the supplementary battery to the weighing circuit when the first switching circuit is open and which closes the electric current path on condition that a predetermined closing command signal is applied thereto when the first switching circuit is closed.

The predetermined closing command signal may include a voltage pulse following switching-on of a main switch of the apparatus and an electric current supply continuation command signal generated from the weighing circuit.

The electronic weighing apparatus may further comprise a third switching circuit inserted in an electric current path from the solar battery to the weighing circuit, the third switching circuit being closed and opened on the same condition as the second switching circuit.

The first switching circuit may have a noncontact switch which is turned on when the output voltage of the solar battery is above a predetermined level, one end of the noncontact switch being connected to a line for the predetermined closing command signal and the other end thereof being connected to a control signal input section for effecting on-off control of the second switching circuit.

The second switch circuit may have a first noncontact switch which is turned on by the predetermined closing command signal applied through the first switching circuit thereto and a second noncontact switch which is inserted in the electric current path from the supplementary battery to the weighing circuit and is turned on due to the turn-on of the first noncontact switch.

The noncontact switch of the first switching circuit may be a field effect transistor consisting of a gate to which the output voltage of the solar battery is applied, a drain to which the predetermined closing command signal is applied and a source connected to the control signal input section of the second switching circuit.

The first noncontact switch may be an NPN transistor and the second noncontact switch may be a PNP transistor, the emitter of the first noncontact switch being grounded, the base thereof being connected to the first switching circuit, the collector thereof being connected to the base of the second noncontact switch and the emitter-collector of the second noncontact switch being inserted in an electric current path from the supplementary battery to the weighing circuit.

According to the above construction, when the weighing apparatus is in a relatively light place and the output voltage of the solar battery is above a predetermined voltage, the battery connected in parallel to the solar battery supplies electric current to the weighing circuit. However, in the case where the weighing apparatus is in a dark place where the output voltage of the solar battery is below the predetermined voltage, the electric current path of the supplementary battery is shut off. Therefore, the waste of electric power in a dark place is effectively prevented.

In the above construction, the switching means may include a first switching element which is turned on when the output voltage of the solar battery is above a predetermined level, a second switching element which is turned on when a predetermined closing command signal is applied thereto and a third switching element which is inserted in the electric current path from said supplementary battery to the weighing circuit and is turned on to close the electric current path when the first and second switching elements are on.

The first and second switching elements may be NPN transistors and the third switching element may be a PNP transistor, the output voltage of the solar battery being applied to the base of the first switching element, the predetermined closing command signal being applied to the base of the second switching element, emitters and collectors of the first and second switching elements being connected in series and inserted between the base of the third switching element and a ground, and an emitter-collector of the third switching element being inserted in an electric current path from the supplementary battery to the weighing circuit.

According to the above construction, the third switching element can be turned on with lower voltage of the solar battery. Therefore, in a place where a fluorescent lamp is used as a light source, such as a kitchen, electric power can be stably supplied from the supplementary battery to the weighing circuit.

According to the above construction also, the switching means is inserted in the electric current path from the supplementary battery to the weighing circuit. The switching means may be inserted in an electric current path through which the electric current from the solar battery and that from the supplementary battery flow, namely, the electric current path from the power circuit to the weighing circuit.

The above weighing circuit may include a weight-capacitance converting section for converting variation in weight into variation in capacitance, a capacitance-frequency converting section for converting the variation in capacitance into variation in frequency, an AND circuit through which an output from the capacitance-frequency converting section passes for a predetermined period of time, a counter for counting the number of pulses having passed through the AND circuit, a microprocessor having a timer for receiving an output from the counter for operating and outputting a signal corresponding to the measured weight and a display for displaying the weight in accordance with the measured weight signal.

A transistor may be inserted between a power source line for supplying electric power from the power supply means to the counter, microprocessor and display and a line for supplying electric power through the power source line to the weight-capacitance converting section, capacitance-frequency converting section and AND circuit, the base of the transistor being connected to an output terminal corresponding to an operating condition of the timer of the microprocessor.

The timer of the microprocessor is used especially in a kitchen balance. A cooking time is set by this timer and, when the set time of the timer is up, the user can take a necessary step, for example, turn off the gas. Therefore, while the timer is in operation (during a time counting), it is of no use to supply electric power to the weight-capacitance converting section, the capacitance-frequency converting section or the like in the weighing circuit. If a transistor the base of which is connected to an output terminal corresponding to the operating condition of the timer of the microprocessor is inserted in a power source line leading to the weight-capacitance converting section and the capacitance-frequency converting section as in the above construction, electric power supply to these sections are stopped when the timer is in operation. This prevents the waste of electric power.

The timer can be set from outside and may output a first alarm signal a predetermined time before a set time and may output a second alarm signal on the set time and the weighing circuit may have an alarm circuit for outputting alarms in response to the alarm signals.

The above construction adds an effect that the user can learn the cooking will be finished soon by the first alarm and can take a necessary step, for example, turn off the gas by the second alarm. Therefore, the user can cook without getting flurried and there is no possibility of missing the alarm.

The microprocessor may have a weight setting section for setting a required weight from outside and for outputting a first alarm signal when the weight of the subject is a predetermined weight less than the set weight and outputting a second alarm signal when the weight is equal to the set weight and the weighing circuit may have an alarm circuit for outputting alarms in response to the alarm signals.

In the weighing apparatus provided with an alarm circuit as above, if the user set the required weight, a reference value for sounding the first alarm is automatically calculated. This leads to a simple operation. In addition, since the alarms are sounded, the user is relaxed in the weighing operation. Further, since the user need not monitor the display, the strain on the user's eyes is reduced.

An output portion of the capacitance-frequency converting section may have means for allowing an output frequency to rise.

Generally, in a weighing apparatus, accuracy is improved by converting slight variation in capacitance into great variation in frequency. For example, if the variation in frequency is 500 Hz in a range of 0 g-1 kg, the weight can be displayed every two grams. If the variation in frequency is 1000 Hz in the same range, the weight can be displayed every gram.

Since the variation in capacitance depends on a construction f the weight-capacitance converting section and is slight, it is necessary to set the frequency corresponding to 0 g high in order to make the variation in frequency of the oscillating circuit great. However, the frequency is limited to a low level because the oscillating circuit is operated with low voltage and a small amount of current by employing a battery as a power source. As a result, it is impossible to obtain the great variation in frequency. On the other hand, according to the present invention, means for allowing the output frequency to rise is provided in the output section of the oscillating circuit. This enables the weighing operation to be effected with high accuracy without increasing the consumption power to such a degree that the oscillating frequency of the oscillating circuit rises.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1A:
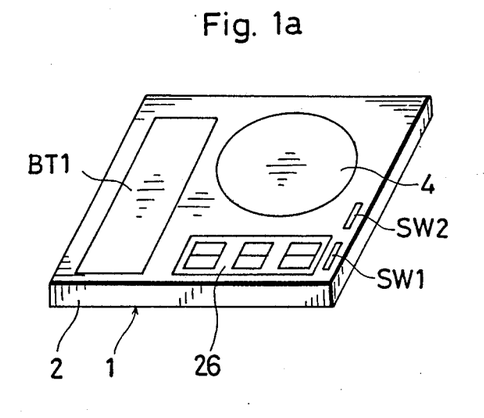
FIG. 1a is a perspective view of a weighing apparatus as an embodiment of the present invention.
Figure 1B:
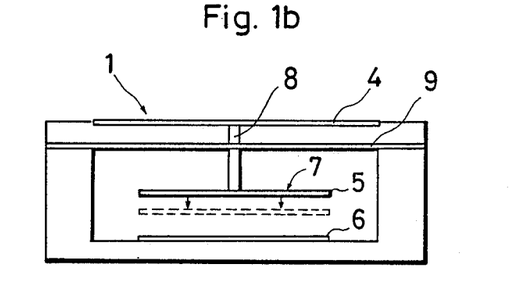
FIG. 1b is a view showing a construction of a weight-capacitance converting section of the above weighing apparatus.

FIG. 1a shows a battery-operated digital weighing apparatus 1 as an embodiment of the present invention. On the upper surface of a casing 2 are provided a solar battery BT1, a display 26 (a liquid crystal display or an LCD in this embodiment), a power switch SW1, and a reset switch SW2. A pan 4 is mounted on the casing 2. Inside the casing 2, as shown in FIG. 1b, are provided a parallel-plate capacitor 7 consisting of a vertically opposed pair of electrodes 5 and 6, a weighing circuit WC and a power circuit 29 (the circuits are not shown). The upper electrode 5 of the parallel-plate capacitor 7 is connected to the pan 4 through a support 8. The support 8 has a plate spring 9 attached to an intermediate portion thereof. The periphery of the plate 9 is fixed to the casing 2. Accordingly, when a subject to be weighed is put on the pan 4, the electrode 5 is moved downward by the weight of the subject against the spring force of the plate spring 9, whereby the capacitance of the parallel-plate capacitor 7 is increased.

Figure 2:
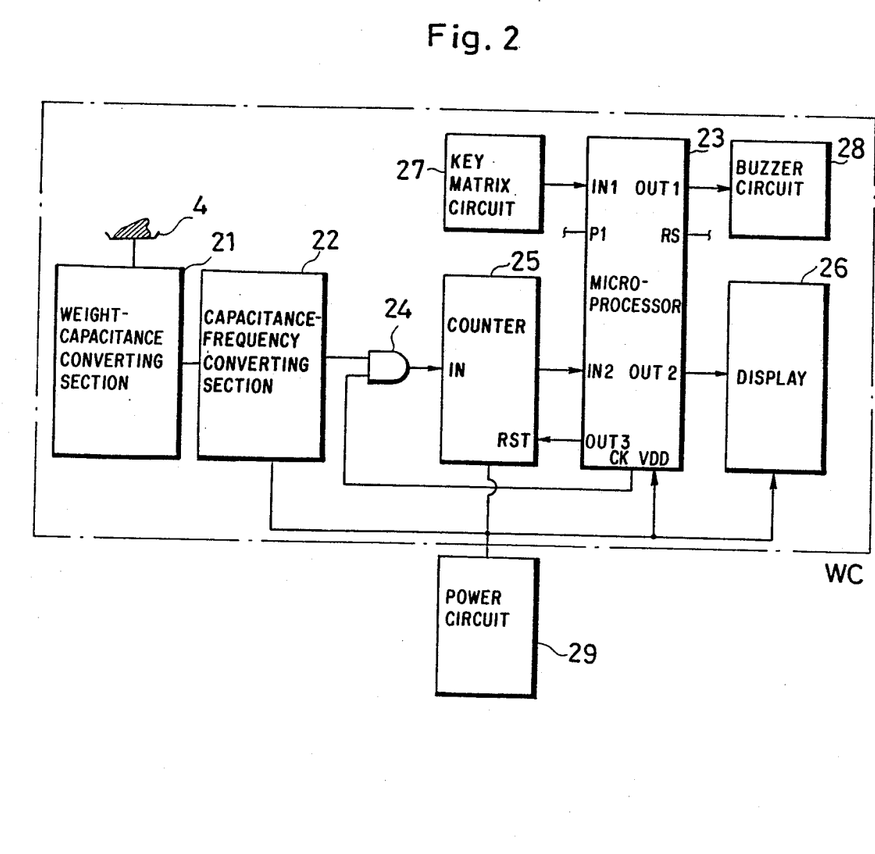
FIG. 2 is a block diagram showing a weighing circuit.

The weighing circuit WC has a construction as surrounded by a chained line in FIG. 2. That is, the weighing circuit WC comprises a weight-capacitance converting section 21 including the above parallel-plate capacitor 7, plate spring 9 and so on, a capacitance-frequency converting section 22 which includes a square wave oscillating circuit having an OP-amp as a main component and which detects variation in capacitance due to the displacement of the parallel-plate capacitor 7 as variation in frequency of the above oscillating circuit, a microprocessor 23 for outputting sampling pulses having a uniform width from its output terminal CK, an AND circuit 24 for deriving a logical product of the sampling pulse and an output signal from the capacitance-frequency converting section 22, a counter 25 for counting output pulses from the AND circuit 24, the display 26 connected to a display output terminal OUT2 of the microprocessor 23 for digitally displaying the weight of the subject on the basis of a weight display output of the microprocessor 23, a key matrix circuit 27 for operating a timer built in the microprocessor 23, said key matrix circuit 27 including a timer mode setting key and a time setting key, and a buzzer circuit (alarm circuit) 28 including a buzzer(not shown) which is driven by an alarm signal output from an alarm output terminal OUT1 of the microprocessor 23 when the time set by the key matrix circuit 27 is up and which sounds an alarm. The time setting keys of the key matrix circuit 27 has a key for setting the number of tens and a key for setting the number of units, both in minutes.

Each of the above circuits is supplied electric power by a power circuit 29. The capacitance-frequency converting section 22 may be realized by employing an astable multivibrator circuit instead of the OP amp. In this case, the parallel-plate capacitor 7 should be connected to the circuit in place of an oscillating frequency determining capacitor.

The weighing operation of the above weighing circuit WC will be explained below. The weight of the subject put on the pan 4 is converted into capacitance by the weight-capacitance converting section 21 and output from the capacitance-frequency converting section 22. On the other hand, sampling pulses having a uniform width are output from the output terminal CK by a clock circuit built in the microprocessor 23. Then, the output signal from the output terminal CK is input to the AND circuit 24 along with the output from the capacitance-frequency converting section 22. Both signals are subjected to a logical operation and the output from the AND circuit 24 is input to the counter 25. The counter 25 counts output pulses from the capacitance-frequency converting section 22 which passes through the AND circuit 24 while the microprocessor 23 outputs one sampling pulse. The counted number is input to the microprocessor 23.

The microprocessor 23 reads the above pulse number and calculates the number of pulses when the weight is 0 g (nothing is put on the pan) and the number of pulses when the weight is Xg(the subject is put on the pan). Then, the microprocessor 23 converts the calculated result into weight which is output from the output terminal OUT2 and input to the display 26. Thus, the weight of the subject is displayed on the display 26.

Next, an alarm sounding operation of the buzzer circuit 28 will be explained. First, the timer mode setting key is pressed to put the apparatus in the timer mode and interrupt the weighing operation. Then, the time is set by the time setting keys in a range of 0–99 minutes. Next, the timer mode setting key is pressed again, whereby the timer in the microprocessor 23 starts to operate. The reference time for the timer is determined by pulses generated from the clock circuit (including a crystal oscillator) of the microprocessor 23.

Figure 3:
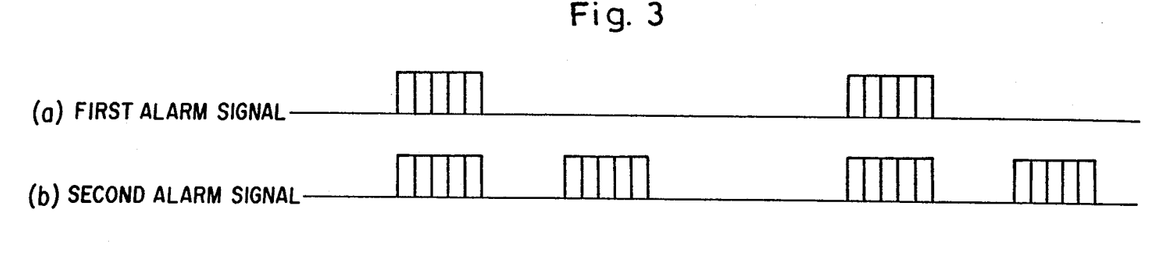
FIG. 3 is a wave form chart to help explain an alarm operation of the weighing circuit.

The microprocessor 23 is programmed to output an alarm from its output terminal OUT1 twice. The first alarm is output 10 seconds before the set time and the second alarm on the set time. The first alarm, as shown in (a) of FIG. 3, comprises single pulses which have frequencies of 2048 Hz or 4096 Hz and are output at a predetermined interval. The second alarm, as shown in (b) of FIG. 3, comprises pairs of pulses with a close spacing which have frequencies of 2048 Hz or 4096 Hz and are output at another predetermined interval. Therefore, the first and second alarms sound "pip . . . pip" and "pipip . . . pipip", respectively.

The key matrix circuit 27 may also be utilized as follows. The key matrix circuit 27 is provided with a preset mode key and keys for setting a required weight. The weight setting keys consist of a key for setting the number of tens and a key for setting a number of units, both in grams. First, the preset mode key is pressed to stop the operation of the weighing apparatus and put the built-in circuit in a preset mode. At this time, the number of units of the set weight is always set 0. Therefore, the weight can be set every ten grams in a range of 10-990 g. Then, the preset mode key is pressed again and the set weight is stored in a memory of the microprocessor 23. The microprocessor 23 calculates a reference value for sounding a first alarm at the point just before the set weight.

The reference value is determined as follows: when the set weight is 50 g or more, the set weight × 90%, and when the set weight is less than 50 g, the set weight −5 g.

After the reference value is calculated as above and the calculated result is stored in the memory of the microprocessor 23, the apparatus is changed back to the weighing mode.

In the following weighing mode, the first alarm is sounded as follows. When the set weight is 50 g or more, the alarm is sounded in the case where set weight->measured weight≧set weight×90% because accuracy need not be so high. When the set weight is less than 50 g, the alarm is sounded in the case where set weight>measured weight≧set weight −5 g because the accuracy need be high.

Since the weight setting data and the reference value for the first alarm are not eliminated unless the microprocessor 23 is reset, for example by power off, the same weight can be measured repeatedly.

Figure 4:
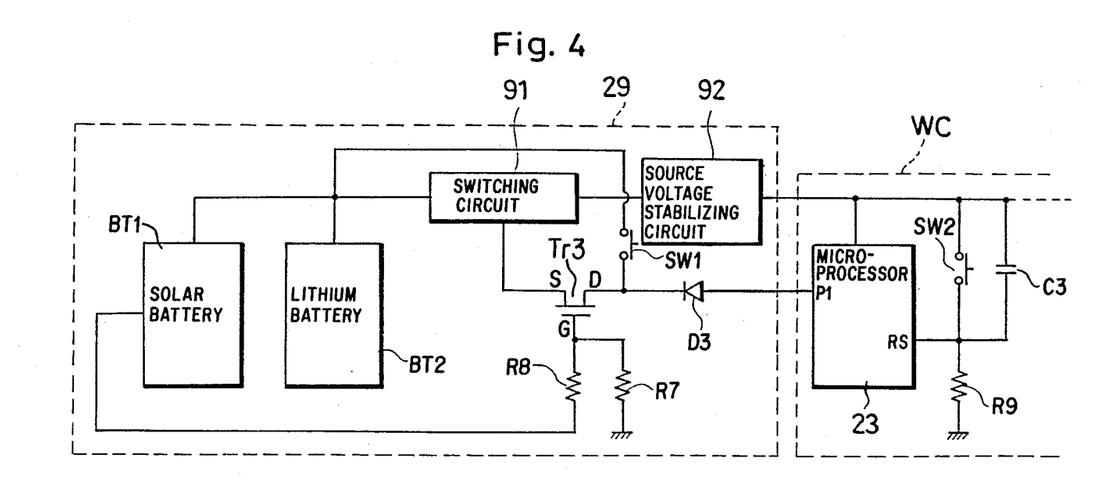
FIG. 4 is a view showing a construction of a power circuit.

Next, the power circuit 29 will be explained in detail. As shown in FIG. 4, the power circuit 29 comprises a solar battery BT1, a lithium battery BT2 as a supplementary battery, a switching circuit 91, a MOSFET Tr3 for controlling the switching circuit 91, a source voltage stabilizing circuit 92 and so on. Electric power is supplied to the weighing circuit WC through the source voltage stabilizing circuit 92. The lithium battery BT2 is provided because the solar battery BT1 cannot produce electric power enough to operate the weighing circuit WC by itself. The switching circuit 91 is disposed between the solar battery BT1, lithium battery BT2 and the source voltage stabilizing circuit 92. On-off of the switching circuit 91 is controlled by the MOSFET Tr3. More particularly, the output voltage of the solar battery BT1 is divided by resistors R8 and R7 to be supplied to the gate G of the MOSFET Tr3 and the electric power from the lithium battery BT2 is supplied to the switching circuit 91 through the power switch SW1 and the MOSFET Tr3. The connecting point of the power switch SW1 and the drain D of the MOSFET Tr3 is connected to an electric current supply terminal P1 of the microprocessor 23 through a protecting diode D3. The electric current from the electric current supply terminal P1 is used to maintain the on-state of the switching circuit 91 for a predetermined period of time after electric power is supplied to the microprocessor 23 by the power circuit 29.

The above predetermined period of time is measured by another timer built in the microprocessor 23 and set, for example, two minutes. When the weight displaying condition of the display 26 is not stabilized, the above timer is programmed to start repeatedly until the weight displaying condition becomes stabilized. The second and the following starts of the timer are effected also by applying high level voltage to a reset terminal RS of the microprocessor 23. The reset terminal RS is connected to an intermediate point of the series circuit including a capacitor C3 disposed between the output terminal of the source voltage stabilizing circuit 92 and the ground and a resistor R9. When the switch SW1 is turned on to supply electric power to the weighing circuit WC, the capacitor C3 and the resistor R9 temporarily heighten the level of the reset terminal RS, whereby the microprocessor 23 is initialized (including the restarting of the timer). The switch SW2 is for manually initializing the microprocessor 23 and is used in measuring the net weight of the subject.

According to the above power circuit 29, when the solar battery BT1 is illuminated at a predetermined level, voltage is applied to the gate G of the MOSFET Tr3 through the voltage dividing resistors R7 and R8. As a result, the MOSFET Tr3 is turned on. At this time, electric current is supplied from the lithium battery BT2 to the switching circuit 91 by turning the power switch SW1 on. Consequently, the switching circuit 91 is closed and electric current is supplied to the weighing circuit WC through the source voltage stabilizing circuit 92, whereby the weighing operation can be effected. Even if the power switch SW1 is turned off immediately after that, the weighing operation can be continued because electric current is supplied from the electric current supply terminal P1 through the diode D3 until the time measurement is completed by the timer built in the microprocessor 23.

When the time measurement by the timer is completed, the electric current supply from the electric current supply terminal P1 is stopped to open the switching circuit 91. In case the power switch SW1 is pressed by mistake, for example hit by something, and remains on, the output from the solar battery BT1 is stopped if the apparatus is placed in a dark place. Accordingly, the potential of the gate G of the MOSFET transistor Tr3 falls and the MOSFET Tr3 is turned off. Therefore, the electric current for maintaining the on-state of the switching circuit 91 is shut off and the lithium battery BT2 is electrically separated from the weighing circuit WC. Even if the power switch SW1 is turned on under this condition, the transistor remains off and therefore, electric current cannot be supplied to the switching circuit 91. As a result, the electric current is not supplied to the weighing circuit WC. If the solar battery is covered with a hand or the like while the apparatus is used, the MOSFET Tr3 is cut off, whereby the electric current from the lithium battery BT2 is shut off. Therefore, the solar battery BT1 can be used as an OFF switch.

Figure 5:
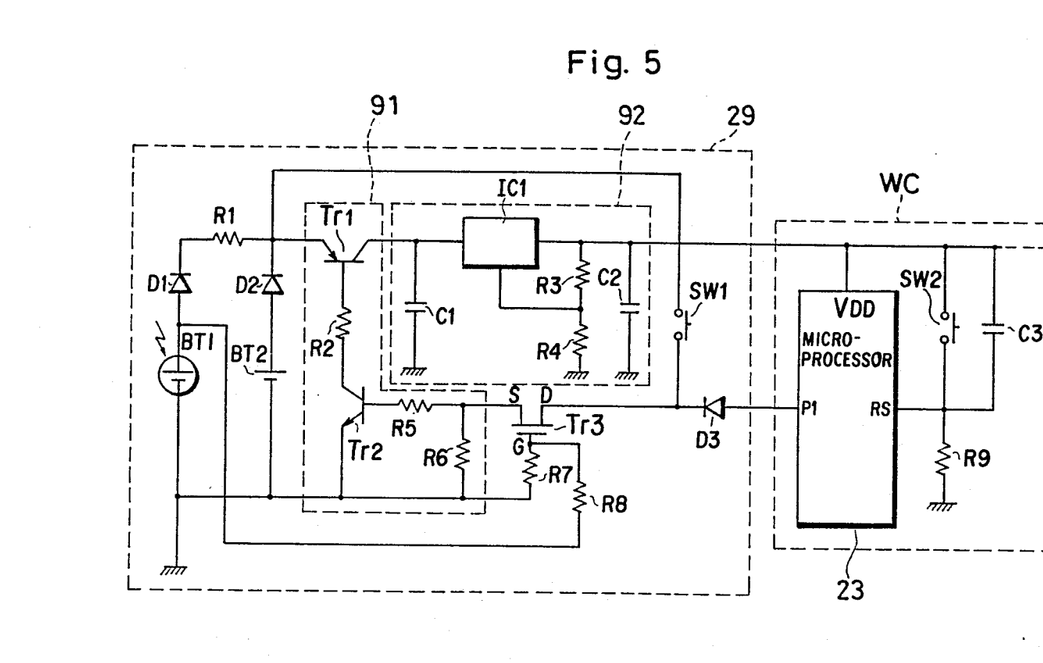
FIG. 5 is a circuit digram showing the power circuit of FIG. 4 in detail.

FIG. 5 shows a concrete circuit construction of the above power circuit 29. The same components as in FIG. 4 are indicated by the same numerals. The solar battery BT1 and the lithium battery BT2 are connected to the emitter of a PNP transistor Tr1 through a reverse current preventing diode D1 and the resistor R1 and through a reverse current preventing diode D2, respectively. The resistor R1 prevents direct contact of the solar battery BT1 and lithium battery BT2 even when the reverse current preventing diodes D1 and D2 are broken. The base of the transistor Tr1 is connected to the collector of an NPN transistor Tr2 through a resistor R2 and the base of the transistor Tr2 is connected to the source S of the MOSFET Tr3 through a resistor R5. A resistor R6 is for completely grounding the base of the transistor Tr2 when the MOSFET Tr3 is cut off. The collector of the transistor Tr1 is connected to the power source stabilizing integrated circuit IC1. The power source stabilizing integrated circuit IC1, stabilizing voltage setting resistors R3 and R4 and ripple removing capacitors C1 and C2 together constitute the source voltage stabilizing circuit 92.

According to the above construction, when the MOSFET Tr3 and the power switch SW1 are turned on, the base potential of the transistor Tr2 rises, whereby the transistor Tr2 is turned on. As a result, the electric current from the lithium battery BT2 is supplied to the source voltage stabilizing circuit 92 through the transistor Tr1, whereby stable voltage can be applied to the weighing circuit WC. When the MOSFET Tr3 is cut off, the transistor Tr2 and Tr1 are cut off successively. Therefore, electric power supply from the lithium battery BT2 is stopped.

Figure 6:
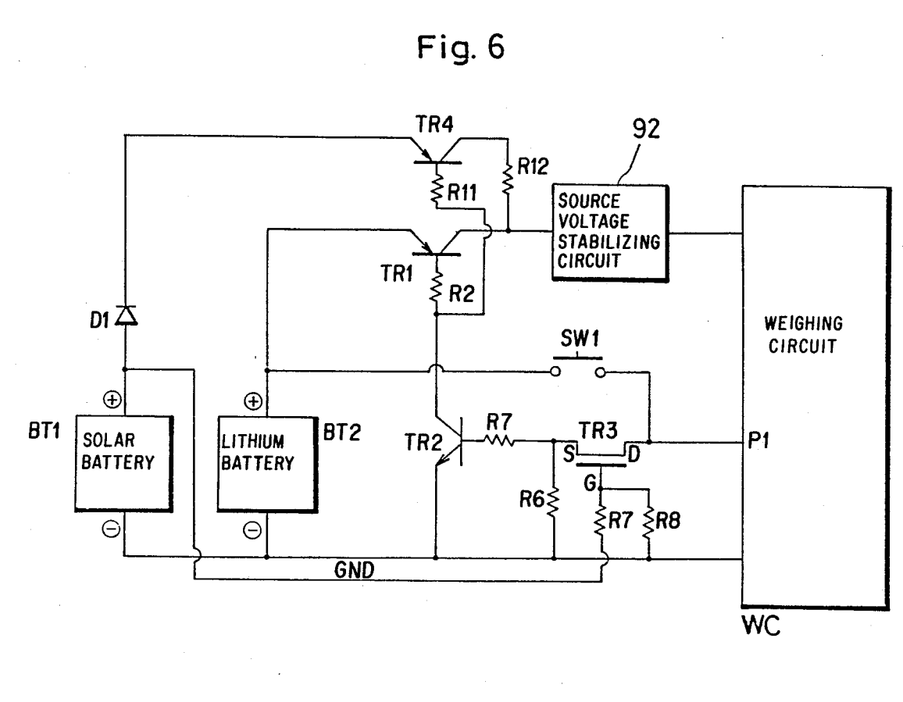
FIG. 6 is a circuit diagram showing another embodiment of the power circuit.

FIG. 6 shows a power circuit as another embodiment of the present invention. The power circuit in this embodiment has the same basic construction as the previous embodiment. In this embodiment, the transistor Tr1 for effecting on-off control of electric power supplied from the lithium battery BT2 to the weighing circuit WC is inserted in the electric current path from the lithium battery BT2 and a transistor Tr4 is inserted in the electric current path from the solar battery BT1, while, in the previous embodiment, the transistor Tr1 is inserted in the electric current path common to the lithium battery BT2 and the solar battery BT1. The base of the transistor Tr4 is connected to the collector of the transistor Tr2 in parallel to the base of the transistor Tr1. In FIG. 6, the same components and circuits as in FIG. 5 are indicated by the same numerals in order to eliminate detailed explanation.

Figure 7:
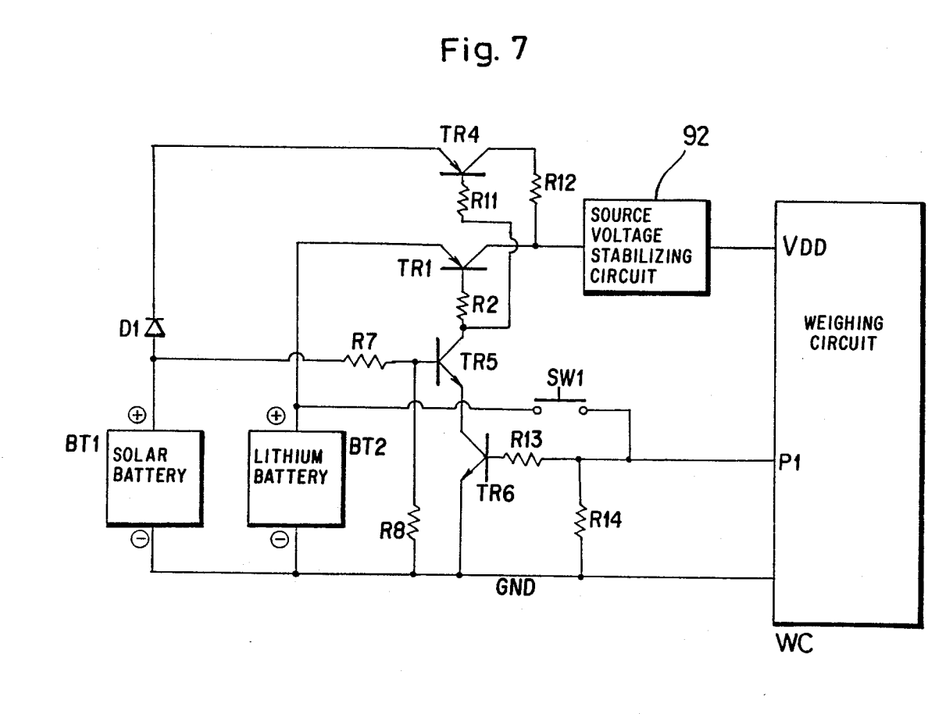
FIG. 7 is a circuit diagram showing a still another embodiment of the power circuit.

FIG. 7 shows a power circuit as a still another embodiment of the present invention. This power circuit is obtained by improving the power circuit shown in FIG. 6. According to the power circuit shown in FIG. 6, the electric current supply to the weighing circuit WC requires a relatively high voltage of the solar battery BT1. That is, in order to turn on the switch SW1 and supply electric power to the weighing circuit WC, the transistor Tr2 and the MOSFET Tr3 must be turned on. This requires the gate voltage of the MOSFET Tr3 to be above the sum of the voltage between the source S and the gate G of the MOSFET Tr3 (approx. 1 V) and the voltage between the emitter and the base of the transistor Tr2 (approx. 0.6 V). In other words, electric power cannot be supplied to the weighing circuit WC unless the output voltage of the solar battery BT1 is above 1.6 V. Even if the Tr3 is not a MOSFET but an NPN transistor, the output voltage of the solar battery BT1 must be higher than the sum of the base-emitter voltage of the transistor Tr2 and that of the transistor Tr3 (0.6+0.6=1.2 V).

The weighing apparatus is usually used under a fluorescent lamp, for example in a kitchen. This arises the problem that the solar battery BT1 cannot obtain enough illumination.

The power circuit of FIG. 7 eliminates the above problem and its construction will be described hereinafter. First, the series circuit including the solar battery BT1, the reverse current preventing diode D1 and transistor Tr4 and the series circuit including the lithium battery BT2 and the transistor Tr1 are connected in parallel. This parallel circuit is connected to the weighing circuit WC through the power voltage stabilizing circuit 92. The construction described hereinbefore is the same as that of FIG. 6. However, as distinct from FIG. 6, the bases of the transistors Tr1 and Tr4 are connected to the ground (GND) through the collectors and emitters of the transistors Tr5 and Tr6. The voltage obtained by dividing the output voltage of the solar battery BT1 by resistors R7 and R8 is applied to the base of the transistor Tr5. The output of the electric current supply terminal P1 of the weighing circuit WC is applied to the base of the transistor Tr6 through a resistor R13. The positive electrode terminal of the lithium battery BT2 is connected to the base of the transistor Tr6 through the switch SW1 in parallel to the electric current supply terminal P1 of the weighing circuit WC.

In this circuit, if the switch SW1 is turned on when the solar battery BT1 receives light, electric current is supplied from the lithium battery BT2 to the base of the transistor Tr6 through the resistor R13. Thus, the transistor Tr6 is turned on. Since the output voltage of the solar battery BT1 is high, electric current is supplied from the solar battery BT1 to the base of the transistor Tr5, whereby the transistor Tr5 is turned on. Then, the base current flows to the transistors Tr1 and Tr4 to turn them on. In this way, electric power is supplied from the solar battery BT1 and the lithium battery BT2 to the weighing circuit WC through the source voltage stabilizing circuit 92. Then, the microprocessor 23 starts to operate and the output of the electric current supply terminal P1 is changed to high level. Therefore, even if the switch SW1 is turned off after that, the base current continues to be supplied to the transistor Tr6. Thus, the transistor Tr6 maintains its on-state. Accordingly, as far as the solar battery BT1 generates output voltage enough to turn on the transistor Tr5, the transistors Tr5 and Tr6 maintains the on-state of the transistors Tr1 and Tr4, whereby electric power is supplied from the solar battery BT1 and the lithium battery BT2 to the weighing circuit WC.

In the above construction, the output voltage $V_0$ of the solar battery BT1 is required to be higher than the sum of the base-emitter voltage $V_{be}$ of the transistor Tr5 and the collector-emitter voltage $V_{ce}$ of the transistor Tr6 in order to turn on the transistor Tr5. The collector-emitter voltage $V_{ce}$ of the transistor Tr6 is negligibly low because the collector current is 10 μA at most. Therefore, the transistor Tr5 is turned on if the output voltage $V_0$ of the solar battery BT1 i above the base-emitter voltage $V_{be}$ of the transistor Tr5. Since the voltage $V_{be}$ is approximately 0.6 V, electric power can be supplied to the weighing circuit WC if the output voltage of the solar battery BT1 must be more than 0.6 V. Accordingly, it is possible to use the weighing apparatus with illumination in a kitchen or the like.

Figure 8:
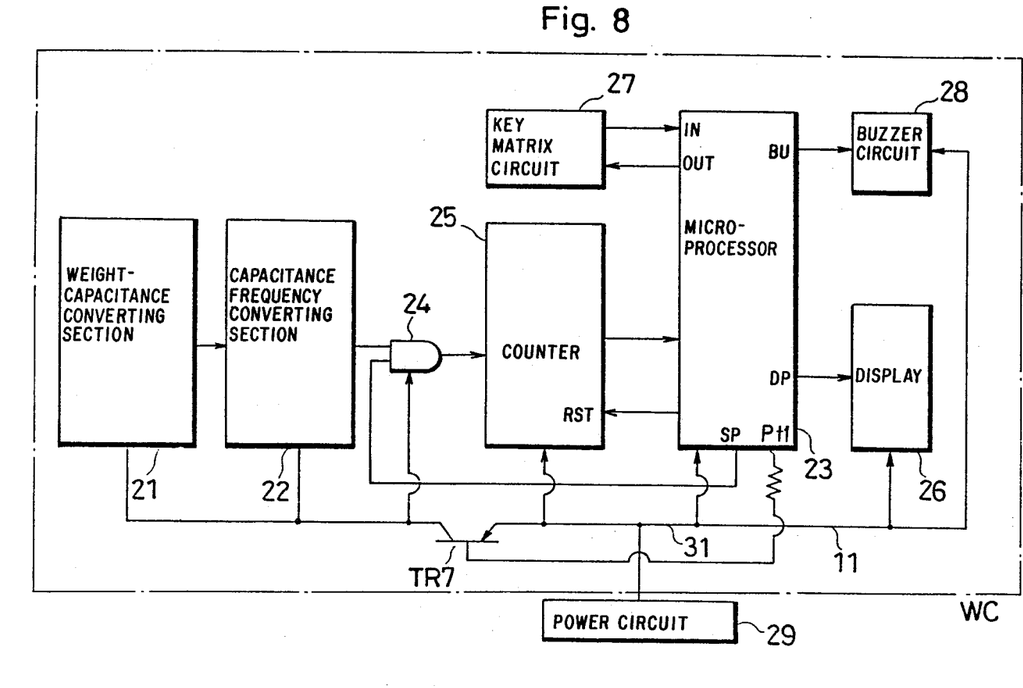
FIG. 8 is a view showing another embodiment of the weighing circuit.

FIG. 8 shows a block diagram as a still further embodiment of the present invention. In this embodiment, the weighing circuit WC is improved in order not to waste the electric power supplied by the power circuit 29. That is, the power circuit 29 directly supplies electric power through the power source line 31 to the microprocessor 23, counter 25, display 26, key matrix circuit 27 and buzzer circuit 28. Other circuits, weight-capacitance converting section 21, capacitance-frequency converting section 22 and AND circuit 24 are supplied electric power through the power source line 31 and a transistor Tr7. The base of the transistor Tr7 is connected to the output terminal Pt1 corresponding to the operating condition of the timer of the microprocessor 23. When the timer is in operation, the level of the output terminal Pt1 is set high in order to cut off the transistor Tr7. Thus, the electric power supply to the weight-capacitance converting section 21, capacitance-frequency converting section 22 and AND circuit 24 are stopped. A circuit having the above construction is very effective for use in a multi-function electronic weighing apparatus with a cooking timer.

Figure 9:
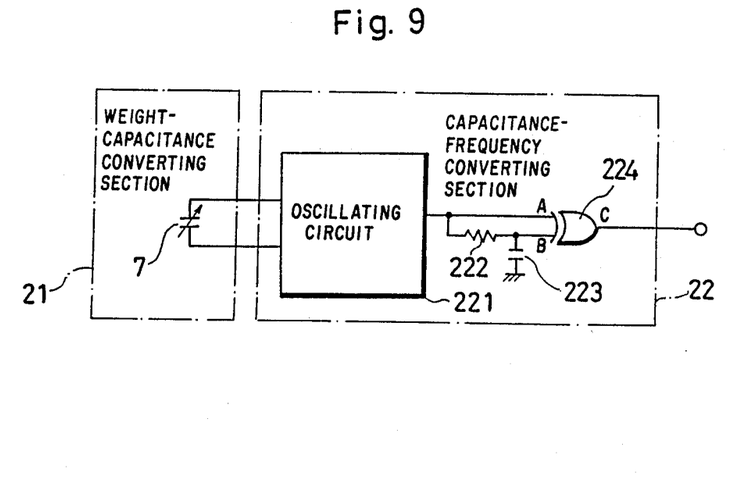
FIG. 9 is a view showing another embodiment of the capacitance-frequency converting section.

FIG. 9 shows a still further embodiment of the present invention. This embodiment is devised to improve the weighing accuracy without increasing the consumption power when the power circuit employs a solar battery and a lithium battery as a power source (same as above). As shown in FIG. 9, the capacitance-frequency converting section 22 comprises an oscillating circuit 221 including an OP-amp as a main component and an exclusive-OR circuit 224. The output terminal of the oscillating circuit 221 is connected to the exclusive-OR circuit directly on one hand and through a delay circuit including a resistor 222 and a capacitor 223 on the other hand.

Figure 10:
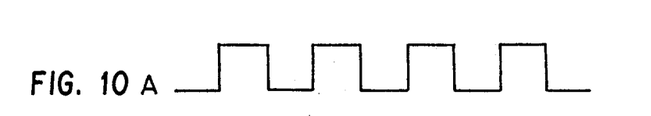
FIG. 10 is a wave form chart to help explain an operation of the circuit of FIG. 9.

According to the above construction, the weight of the subject is detected by the weight-capacitance converting section 21 as the capacitance of the capacitor 7 and the oscillating signal of the frequency determined by the capacitance is output from the oscillating circuit 221 of the capacitance-frequency converting section 22. In FIG. 10, A shows the wave form of the above signal. This signal is input to the exclusive OR circuit 224 directly and through the delay circuit. The signal at the position B of the exclusive OR circuit 224 has a wave form as shown in B of FIG. 10. Since the output from the exclusive OR circuit 224 changes on the basis of the following truth table, output pulses are generated at the rising point and the falling point of the output A. As a result, the output from the exclusive OR circuit 224 has double the frequencies of the input A.

| Truth Table | | |
|---|---|---|
| A | B | C |
| 1 | 0 | 1 |
| 1 | 1 | 0 |
| 0 | 0 | 0 |
| 0 | 1 | 1 |

Therefore, the counter counts the output C having the doubled frequency (refer to C in FIG. 10) at predetermined sampling periods and outputs the counted value to the microprocessor 23. The microprocessor 23 displays the weight on the basis of the above counted value.

The nearer to 50% the duty ratio of the output A is, the more effective it is to double the frequency. In general, the exclusive OR circuit 224 comprises an integrated circuit having a C-MOS construction. This can be used in a frequency range of up to 20–30 kHz with a small amount of electric current.

In each embodiment, a lithium cell is employed as a supplementary cell. Other cells may of course be employed.

Although the present invention has been fully described by way of examples with reference to the accompanying drawings, it is to be noted that various changes and modifications will be apparent from to those skilled in the art. Therefore, unless otherwise such changes and modifications depart from the scope of the present invention, they should be construed as being included herein.

What is claimed is:

1. An electronic weighing apparatus for weighing a subject comprising:
   a weighing circuit which detects the weight of the subject by variation in capacitance, converts an oscillating output of an oscillating circuit corresponding to said variation into weight and displays the converted value on a display;
   power supply means for supplying a driving current to said weighing circuit, said power supply means including a solar battery and a supplementary battery; and
   switching means for effecting on-off control of electric current supply from said supplementary battery to said weighing circuit in accordance with the output voltage of said solar battery.

2. An electronic weighing apparatus as claimed in claim 1, wherein said switching means includes a first switching circuit which is closed and opened by the output voltage of said solar battery and a second switching circuit which opens at least an electric current path from the supplementary battery to the weighing circuit when the first switching circuit is open and which closes said electric current path on condition that a predetermined closing command signal is applied thereto when the first switching circuit is closed.

3. An electronic weighing apparatus as claimed in claim 2, wherein said first switching circuit has a noncontact switch which is turned on when the output voltage of the solar battery is above a predetermined level, one end of said noncontact switch being connected to a line for the predetermined closing command signal and the other end thereof being connected to a control signal input section for effecting on-off control of said second switching circuit.

4. An electronic weighing apparatus as claimed in claim 2, wherein said second switching circuit has a first noncontact switch which is turned on by the predetermined closing command signal applied through said first switching circuit thereto and a second noncontact switch which is inserted in an electric current path from said power supply means to said weighing circuit and is turned on due to the turn-on of said first noncontact switch.

5. An electronic weighing apparatus as claimed in claim 3, wherein said noncontact switch is a field effect transistor consisting of a gate to which the output voltage of the solar battery is applied, a drain to which the predetermined closing command signal is applied and a source connected to the control signal input section of said second switching circuit.

6. An electronic weighing apparatus as claimed in claim 4, wherein said first noncontact switch is an NPN transistor and said second noncontact switch is a PNP transistor, the emitter of said first noncontact switch being grounded, the base thereof being connected to said first switching circuit, the collector thereof being connected to the base of said second noncontact switch and the emitter-collector of said second noncontact switch being inserted in an electric current path from said power supply means to said weighing circuit.

7. An electronic weighing apparatus as claimed in claim 2, wherein said predetermined closing command signal includes a voltage pulse following switching-on of a main switch of the apparatus and an electric current supply continuation command signal generated from said weighing circuit.

8. An electronic weighing apparatus as claimed in claim 1, wherein said weighing circuit includes a weight-capacitance converting section for converting variation in weight into variation in capacitance, a capacitance-frequency converting section for converting said variation in capacitance into variation in frequency, an AND circuit through which an output from said capacitance-frequency converting section passes for a predetermined period of time, a counter for counting the number of pulses having passed through said AND circuit, a microprocessor having a timer for receiving an output from said counter for operating and outputting a signal corresponding to the measured weight and a display for displaying the weight in accordance with said measured weight signal.

9. An electronic weighing apparatus as claimed in claim 8, wherein a transistor is inserted between a power source line for supplying electric power from said power supply means to said counter, microprocessor and display and a line for supplying electric power through said power source line to said weight-capacitance converting section, capacitance-frequency converting section and AND circuit, the base of said transistor being connected to an output terminal corresponding to an operating condition of the timer of said microprocessor.

10. An electronic weighing apparatus as claimed in claim 8, wherein said timer can be set from outside and outputs a first alarm signal a predetermined time before a set time and outputs a second alarm signal on the set time and wherein said weighing circuit has an alarm circuit for outputting alarms in response to said alarm signals.

11. An electronic weighing apparatus as claimed in claim 8, wherein said microprocessor has a weight setting section for setting a required weight from outside and for outputting a first alarm signal when the weight of the subject to be weighed is below a set weight and outputting a second alarm signal when the weight is equal to the set weight and wherein said weighing circuit has an alarm circuit for outputting alarms in response to said alarm signals.

12. An electronic weighing apparatus as claimed in claim 8, wherein an output portion of said capacitance-frequency converting section has means for allowing an output frequency to rise.

13. An electronic weighing apparatus for weighing a subject, comprising:
a weighing circuit which detects the weight of the subject by variation in capacitance, converts an output of an oscillating circuit corresponding to said variation in capacitance into weight and displays the converted value on a display section;
power supply means for supplying driving current to said weighing circuit which includes a solar battery and a supplementary battery connected substantially in parallel; and
switching means inserted in an electric current path from said supplementary battery to said weighing circuit, on-off control of said switching means being effected by the output voltage of said solar battery.

14. An electronic weighing apparatus as claimed in claim 13, wherein said switching means includes a first switching circuit which is closed and opened by the output voltage of said solar battery and a second switching circuit which opens at least the electric current path from the supplementary battery to the weighing circuit when the first switching circuit is open and which closes said electric current path on condition that a predetermined closing command signal is applied thereto when the first switching circuit is closed.

15. An electronic weighing apparatus as claimed in claim 14, wherein said predetermined closing command signal includes a voltage pulse following switching-on of a switch of the apparatus and an electric current supply continuation command signal generated from said weighing circuit.

16. An electronic weighing apparatus as claimed in claim 14, further comprising a third switching circuit inserted in an electric current path from said solar battery to said weighing circuit, said third switching circuit being closed and opened on the same condition as said second switching circuit.

17. An electronic weighing apparatus as claimed in claim 14, wherein said first switching circuit has a noncontact switch which is turned on when the output voltage of the solar battery is above a predetermined level, one end of said noncontact switch being connected to a line for the predetermined closing command signal and the other end thereof being connected to a control signal input section for effecting on-off control of said second switching circuit.

18. An electronic weighing apparatus as claimed in claim 14, wherein said second switch circuit has a first noncontact switch which is turned on by the predetermined closing command signal applied through said first switching circuit thereto and a second noncontact switch which is inserted in the electric current path from said supplementary battery to said weighing circuit and is turned on due to the turn-on of said first noncontact switch.

19. An electronic weighing apparatus as claimed in claim 17, wherein said noncontact switch is a field effect transistor consisting of a gate to which the output voltage of the solar battery is applied, a drain to which the predetermined closing command signal is applied and a source connected to the control signal input section of said second switching circuit.

20. An electronic weighing apparatus as claimed in claim 18, wherein said first noncontact switch is an NPN transistor and said second noncontact switch is a PNP transistor, the emitter of said first noncontact switch being grounded, the base thereof being connected to said first switching circuit, the collector thereof being connected to the base of said second noncontact switch and the emitter-collector of said second noncontact switch being inserted in an electric current path from said supplementary battery to said weighing circuit.

21. An electronic weighing apparatus as claimed in claim 13, wherein said switching means includes a first switching element which is turned on when the output voltage of said solar battery is above a predetermined level, a second switching element which is turned on when a predetermined closing command signal is applied thereto and a third switching element which is inserted in the electric current path from said supplementary battery to said weighing circuit and is turned on to close the electric current path when said first and second switching elements are on.

22. An electronic weighing apparatus as claimed in claim 21, wherein said first and second switching elements are NPN transistors and said third switching element is a PNP transistor, the output voltage of the solar battery being applied to the base of said first switching element, the predetermined closing command signal being applied to the base of said second switching element, emitters and collectors of said first and second switching elements being connected in series and inserted between the base of said third switching element and a ground, and an emitter-collector of said third switching element being inserted in an electric current path from said supplementary battery to said weighing circuit.

23. An electronic weighing apparatus as claimed in claim 21, wherein said predetermined closing command signal includes a voltage pulse following switching-on of a main switch of the apparatus and an electric current supply continuation command signal generated from said weighing circuit.

24. An electronic weighing apparatus as claimed in claim 21, further comprising a fourth switching element which is inserted in an electric current path from said solar battery to said weighing circuit, said fourth switching element being closed and opened on the same condition as said third switching element.

25. An electronic weighing apparatus as claimed in claim 13, wherein said weighing circuit includes a weight-capacitance converting section for converting variation in weight into variation in capacitance, a capacitance-frequency converting section for converting said variation in capacitance into variation in frequency, an AND circuit through which an output from said capacitance-frequency converting section passes for a predetermined period of time, a counter for counting the number of pulses having passed through said AND circuit, a microprocessor having a timer for receiving an output from said counter for operating and outputting a signal corresponding to the measured weight and a display for displaying the weight in accordance with said measured weight signal.

26. An electronic weighing apparatus as claimed in claim 25, wherein a transistor is inserted between a power source line for supplying electric power from said power supply means to said counter, microprocessor and display and a line for supplying electric power through said power source line to said weight-capacitance converting section, capacitance-frequency converting section and AND circuit, the base of said transistor being connected to an output terminal corresponding to an operating condition of the timer of said microprocessor.

27. An electronic weighing apparatus as claimed in claim 25, wherein said timer can be set from outside and outputs a first alarm signal a predetermined time before a set time and outputs a second alarm signal on the set time and wherein said weighing circuit has an alarm circuit for outputting alarms in response to said alarm signals.

28. An electronic weighing apparatus as claimed in claim 25, wherein said microprocessor has a weight setting section for setting a required weight from outside and for outputting a first alarm signal when the weight of the subject is a predetermined weight less than the set weight and outputting a second alarm signal when the weight is equal to the set weight and wherein said weighing circuit has an alarm circuit for outputting alarms in response to said alarm signals.

29. An electronic weighing apparatus as claimed in claim 25, wherein an output portion of said capacitance-frequency converting section has means for allowing an output frequency to rise.

* * * * *